United States Patent [19]

Fukuyasu et al.

[11] Patent Number: 4,870,022
[45] Date of Patent: Sep. 26, 1989

[54] APPARATUS AND METHOD FOR PRODUCING MISO

[75] Inventors: Shigeki Fukuyasu; Makoto Nakamura, both of Toyokawa; Kyozo Kawachi, Tokyo; Seiji Yamaguchi, Sagamihara; Sakan Kinoshita, Yokohama; Tadashi Numata, Kamakura, all of Japan

[73] Assignees: Ichibiki Co., Ltd., Nagoya; Kabushiki Kaisha Toshiba, Kawasaki; Shibaura Engineering Works Co., Ltd., Tokyo, all of Japan

[21] Appl. No.: 102,858

[22] Filed: Sep. 30, 1987

[30] Foreign Application Priority Data

Oct. 2, 1986 [JP] Japan .................................. 61-233348

[51] Int. Cl.$^4$ .............................................. C12C 1/00
[52] U.S. Cl. ................................... 435/302; 435/313; 435/288
[58] Field of Search ..................... 435/302, 316, 313

[56] References Cited

U.S. PATENT DOCUMENTS

| 470,902 | 3/1892 | Sobotka et al. | 435/302 X |
|---|---|---|---|
| 2,338,228 | 1/1944 | Boeckeler et al. | 435/313 |
| 2,371,208 | 3/1945 | Alzola | 435/313 X |
| 3,423,491 | 1/1969 | McLain et al. | 428/398 |
| 3,674,620 | 7/1972 | Fabre | 428/398 |
| 3,720,583 | 3/1973 | Fisher | 435/302 X |
| 4,673,650 | 6/1987 | Braden | 435/288 X |

Primary Examiner—Larry Jones
Attorney, Agent, or Firm—Oblon, Spivak, McClelland, Maier & Neustadt

[57] ABSTRACT

A method of producing miso according to this invention comprises the steps of preparing a raw solution as a flavor raw material of the miso, converting the raw solution into a flavor solution by means of a predetermined fermentation treatment, preparing a digested material as a major raw material of the miso, and mixing the flavor solution with the digested material, to thereby produce the miso.

27 Claims, 3 Drawing Sheets

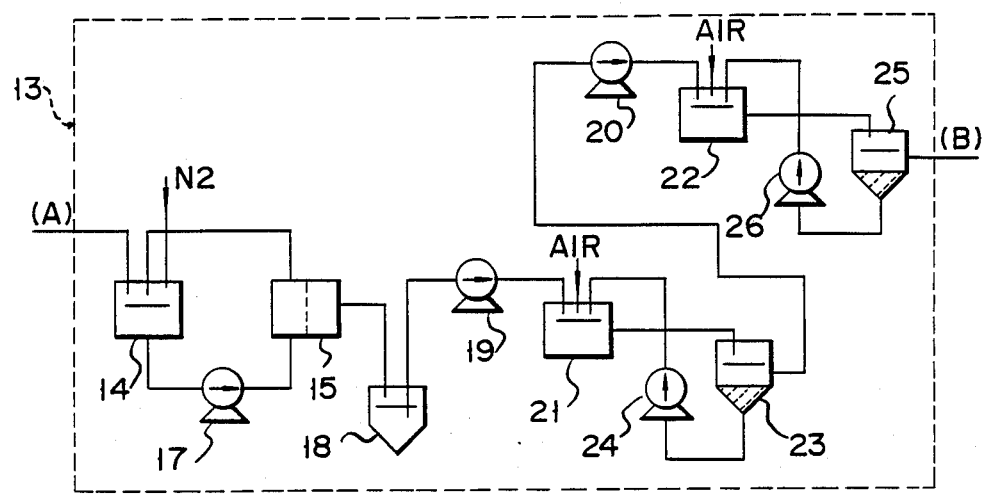
F I G. 4
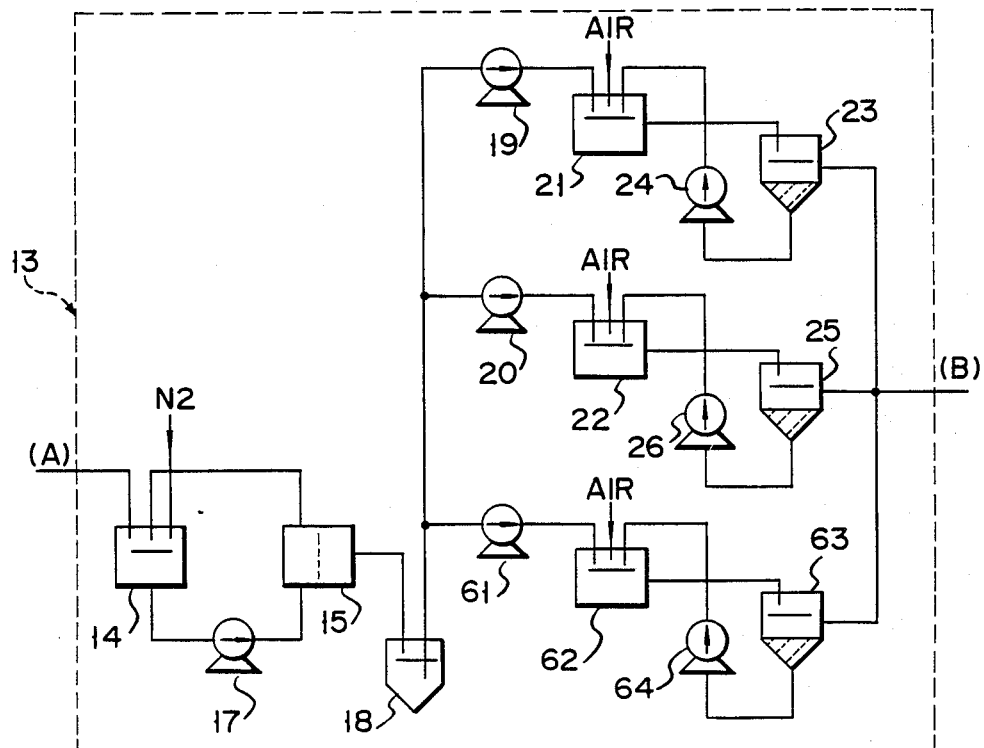
F I G. 6

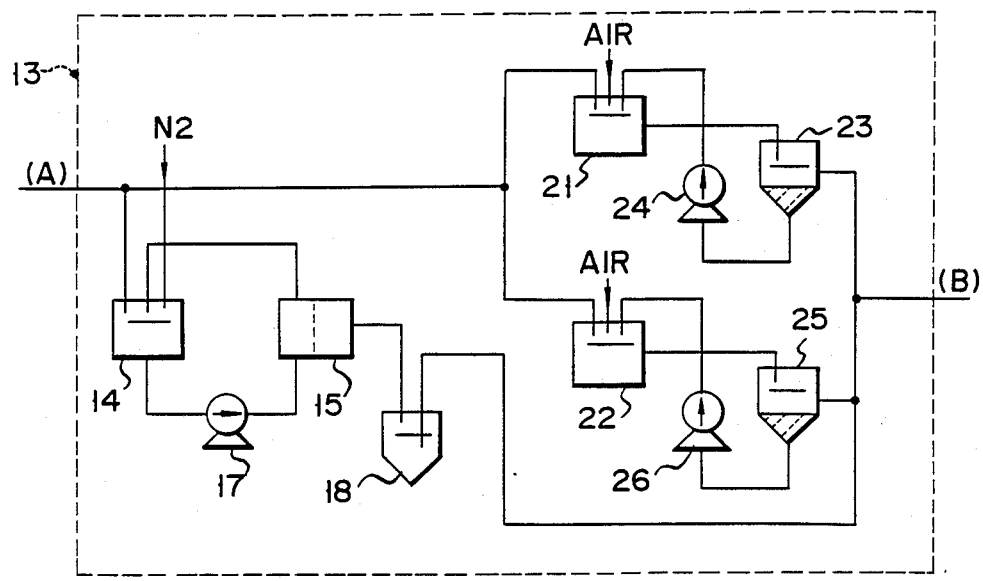
F I G. 5
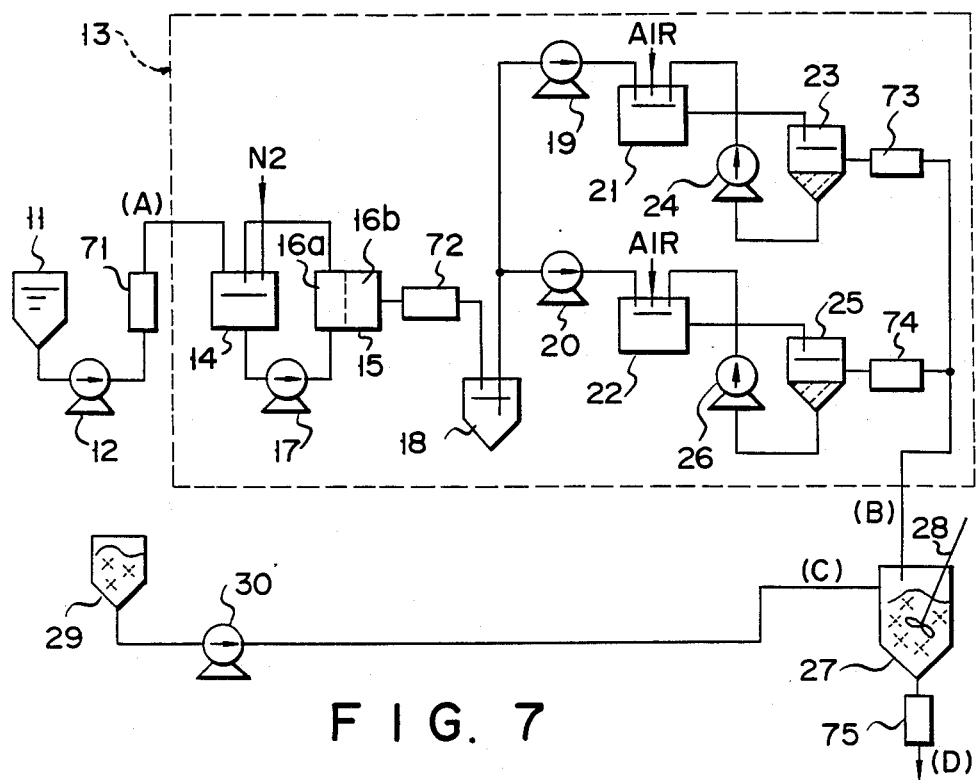
F I G. 7

APPARATUS AND METHOD FOR PRODUCING MISO

BACKGROUND OF THE INVENTION

The present invention relates to an apparatus and method for producing miso.

Conventionally, miso is produced as follows:

A mixture of steamed-boiled soybeans, koji of rice, salt, and yeast is placed in a stainless tank and is kept at a temperature of 28° C. to 32° C. for one to three months, for fermentation and ripening to take place, whereby miso is produced.

The disadvantage inherent in the conventional method, as described above, in that the fermentation and ripening process takes a considerable length of time. Consequently, the conventional method of producing miso requires the use of a large number of fermentation tanks, as well as the availability of a large amount of storage space for storing the end-product. In addition, since it is not possible, when using the conventional method, to precisely control fermentation and ripeness, it is therefore difficult to obtain miso of a consistent, uniform quality, e.g., uniform salt content, alcohol content, amino acid content, lactic content, and so forth.

SUMMARY OF THE INVENTION

It is a first object of the present invention to provide an apparatus and method for producing a fast-brewing miso, whereby miso of a consistent, uniform quality can be produced within a short period of time.

It is a second object of the present invention to provide an apparatus and method for producing a low-salt fast-brewing miso having a uniform quality.

In order to achieve the first object, according to the present invention, a raw solution (A) of miso is supplied to a fermentation mechanism (13), and a flow-out solution (B) from the fermentation mechanism and a digested material (C) are supplied to a mixing tank (27), so that the flow-out solution (B) and the digested material (C) are mixed in the mixing tank, to brew miso (D) quickly. (Note that a product obtained by digesting at about 55° C. a mixture chiefly consisting of the steamed-boiled soybeans, koji of rice, and salt is called a digested material. Also the flow-out solution (B) is called a flavor solution).

In order to achieve the second object, according to the present invention, a solution flowed from the fermentation mechanism is subjected to sterilization (73, 74) such as by heating, thereby resulting in decrease in a salt concentration of the miso.

BRIEF DESCRIPTION OF THE DRAWINGS

FIG. 4 is a diagram schematically showing an arrangement of a modification of fermentation mechanism 13 shown in FIG. 1;

FIG. 5 is a diagram schematically showing an arrangement of another modification of fermentation mechanism 13 shown in FIG. 1;

FIG. 6 is a diagram schematically showing an arrangement of still another modification of fermentation mechanism 13 shown in FIG. 1; and FIG. 7 is a diagram schematically showing an arrangement of an apparatus suitable for producing a low-salt miso according to another embodiment of the present invention.

DETAILED DESCRIPTION OF THE PREFERRED EMBODIMENTS

Figure 1:
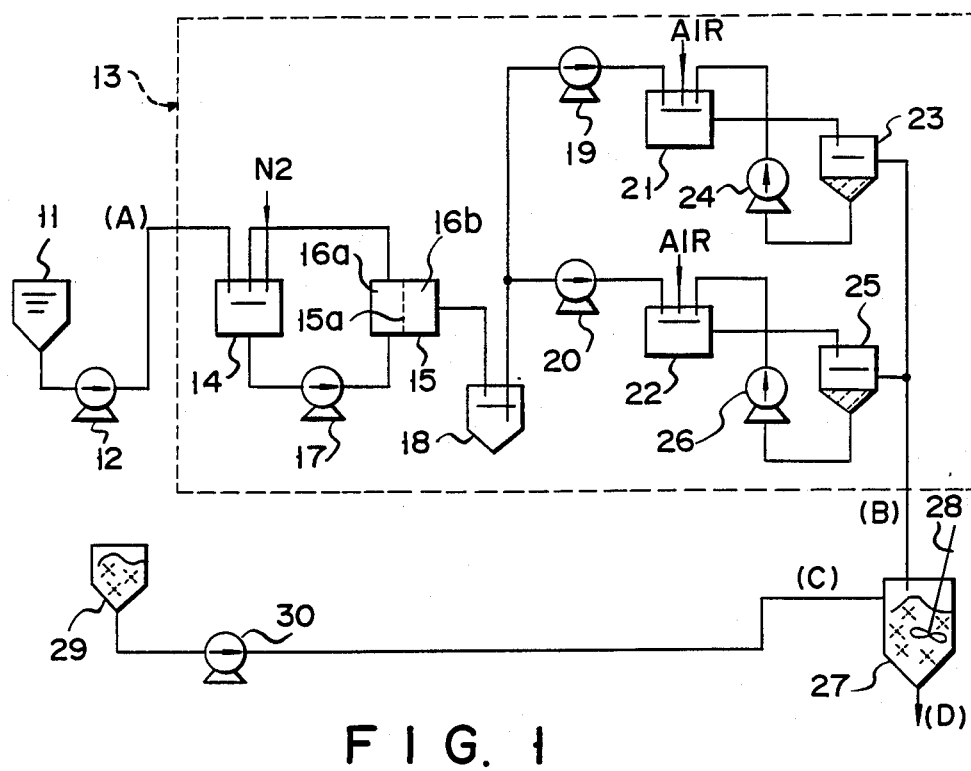
FIG. 1 is a diagram schematically showing an arrangement of a miso producing apparatus according to an embodiment of the present invention.

An embodiment of the present invention will now be described with reference to the accompanying drawings. Note that the same reference numerals in the drawings indicate components having the same functions.

The present invention was made based on the following four findings.

(1) Fermentation and ripening are based on three microbial reaction steps, that is, lactic fermentation using Pediococcus halophilus (lactic acid bacteria) as a dominant strain, main fermentation using Zygosaccharomyces rouxii (main fermentation yeast) as a dominant strain, and afterripening fermentation using Candida versatilis (afterripening fermentation yeast) as a dominant strain. (Note that as lactic acid bacteria used in the lactic fermentation, Pediococcus sojae, Pediococcus acidilactici, Pediococcus pentosaceus, Streptococcus faecalis, or Streptococcus faecium may be employed. As the afterripening fermentation yeast, Candida etchellsii may be employed.)

(2) Only soluble components (monosaccharides, amino acids, organic acids, vitamins, peptides, and the like) of a digested material contribute to the microbial reaction for fermentation and ripening. The digested material contains about 30 to 50% of the soluble components, and the residual components are left unreacted.

(3) The microbial reaction rate described in item (1) depends on a salt concentration of a solution in which the reaction progresses. For example, when the salt concentration is decreased from a conventional high salt concentration (15 to 18%) to half, i.e., to a low-salt concentration (7%), the reaction rate is increased to about 10 times at a temperature of 30° C.

(4) A raw solution (a mixture of glucose, tamari-shoyu, salt, and the like) corresponding to the soluble components is fermented and ripened in a short period by the high-speed reaction of item (3). The resultant fermented, ripened solution (flavor solution) is mixed with the digested material, thereby producing miso.

The present invention was based on above findings (1) to (4). An apparatus of the present invention comprises a fermentation mechanism to which a raw solution (A) is supplied and which includes a multi-stage fermentation tank, and a mixing tank (27) for mixing a flavor solution obtained from the fermentation mechanism (13) and a digested material (C). In this apparatus, the flavor solution (B) is prepared by the fermentation mechanism (13) in a short period, and the flavor solution (B) and the digested material (C) are slowly stirred and mixed in the mixing tank (27). In this manner, miso (D) of a uniform quality can be brewed quickly.

FIG. 1 shows a schematic arrangement of a miso producing apparatus according to an embodiment of the present invention.

A raw solution containing glucose, tamari-shoyu, salt, and the like is stored in storage tank 11. The bottom portion of storage tank 11 is connected to fermentation mechanism 13 through a pipe via pump 12. Pump 12 supplies raw solution (A) to fermentation tank 14 for lactic fermentation in fermentation mechanism 13. The outlet at the bottom portion of fermentation tank 14 is connected to the inlet of condensed solution chamber 16a of ultrafiltration module 15 through a pipe via pump 17. The outlet of condensed solution chamber 16a is connected to fermentation tank 14 via a pipe. A solution in fermentation tank 14 is circulated between tank 14 and condensed solution chamber 16a.

Note that ultrafiltration module 15 can be that disclosed in, for example, U.S. Pat. No. 3,674,628 or in U.S. Pat. No. 3,423,491. The present invention incorporates all the disclosures of these U.S. patents.

Filtered solution chamber 16b of module 15 is connected to the upper portion of storage tank 18 through a pipe. The bottom portion of storage tank 18 is connected through pipes to the upper portion of fermentation tank 21 for main fermentation via pump 19 and to the upper portion of fermentation tank 22 for afterripening fermentation via pump 20. The side portion of main fermentation tank 21 is connected through a pipe to the upper portion of precipitation tank 23. The bottom portion of tank 23 is connected through a pipe to the upper portion of fermentation tank 21. Similarly, the side portion of afterripening fermentation tank 22 is connected through a pipe to the upper portion of precipitation tank 25, and the bottom portion of tank 25 is connected through a pipe to the upper portion of fermentation tank 22 via pump 26.

In above-mentioned three fermentation tanks 14, 21, and 22, the following operations are performed.

In lactic fermentation tank 14, $10^5$/ml of lactic acid bacteria (e.g., Pediococcus halophilus) is added at the initial stage upon production of miso.

Figure 2:
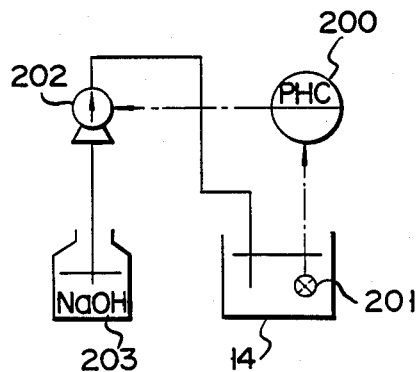
FIG. 2 is a diagram schematically showing a pH controller for controlling the pH of lactic fermentation tank 14 shown in FIG. 1 to be constant.
Figure 3:
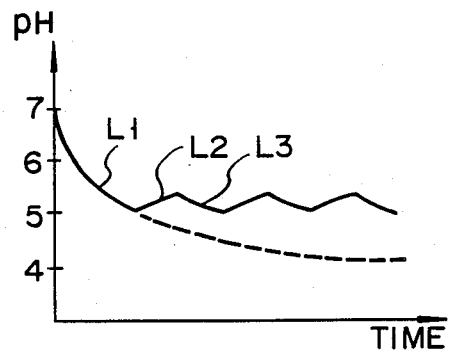
FIG. 3 is a graph for explaining the operation of the pH controller shown in FIG. 2.

Raw solution (A) with bacteria in tank 14 is subjected to automatic pH control by pH controller 200 shown in FIG. 2 to have pH=5.0 to 5.5. FIG. 3 is a graph for explaining the operation of the pH controller shown in FIG. 2. More specifically, the pH of the solution in tank 14 is detected by pH meter 201 dipped in this solution. If the pH detection result indicates pH =5.0 or higher, pH controller 200 performs no operation. In this case, the pH of the solution in tank 14 is gradually decreased due to the effect of lactic acid bacteria upon lapse of time, as indicated by curve L1 in FIG. 3. However, if the pH detection result indicates pH =5.0 or lower, pH controller 200 drives pump 202 to start injection of NaOH solution 203 for adjusting the pH into tank 14. Upon injection of NaOH solution 203, the pH of the solution in tank 14 is increased as indicated by L2 in FIG. 3. When the pH of the solution has reached 5.5, pH controller 200 causes pump 202 to stop injection of NaOH solution 203 into tank 14. The pH of the solution is then decreased as indicated by L3 in FIG. 3. The pH of raw solution (A) in tank 14 can be automatically controlled to pH =5.0 to 5.5. Note that upon pH control, if the pH must be forcibly decreased, a lactic acid can be used in place of NaOH.

The pH controlled lactic fermentation solution is allowed to reside in tank 14 at a temperature of 30° C. for 24 to 72 hours. During residence, a nitrogen gas is flowed through the solution in tank 14 at a ratio of 10 V/V/hr (a ratio of a gas volume flowing through the solution per hour with respect to a volume of tank 14), and a carbon dioxide gas generated by oxygen mixed in tank 14 and metabolism is purged.

In fermentation tank 21, $10^5$/ml of main fermentation yeast (e.g., Zygosaccharomyces rouxii) is added at the initial stage. The solution with yeast cells is allowed to reside in tank 21 at a temperature of 30° C. for 24 to 72 hours. During residence, aseptic air is flowed in the solution in tank 21 at a ratio of 0.1 to 10 V/V/hr to introduce oxygen necessary and sufficient for multiplication of main fermentation yeast into tank 21, and a carbon dioxide gas generated by metabolism due to a nitrogen gas in an air flow is purged.

In afterripening fermentation tank 22, $10^5$/ml of afterripening fermentation yeast (e.g., Candida versatilis) is added at the initial stage. The solution with yeast cells is allowed to reside in tank 22 at a temperature of 30° C. for 24 to 72 hours. During residence, aseptic air is flowed through the solution in tank 22 at a ratio of 0.1 to 10 V/V/hr to introduce oxygen necessary and sufficient for multiplication of afterripening fermentation yeast into tank 22 in the same manner as in tank 21, and a carbon dioxide gas generated by metabolism due to a nitrogen gas in an air flow is purged.

Note that the concentration ($10^5$/ml) of cells to be added in tanks 14, 21, and 22 may be appropriately changed. However, if the concentration is too low (e.g., $10^3$/ml), a rise time of fermentation progress is delayed while if it is too high (e.g., $10^7$/ml), the tanks are undesirably filled with low-activity cells. Thus, the concentration must be carefully set.

The arrangement of FIG. 1 will be again described. The bottom portion of storage tank 29 storing the digested material is connected through a pipe to the upper portion of mixing tank 27. The side portions of precipitation tanks 23 and 25 in fermentation mechanism 13 are also connected through pipes to the upper portion of mixing tank 27. Tank 27 is equipped with stirrer 28. Flavor solution (B) from precipitation tanks 23 and 25, and digested material (C) from storage tank 29 are slowly mixed in mixing tank 27, and miso as a product is supplied from the bottom portion of tank 27.

The fermentation and ripening operations comprising the lactic fermentation step, the main fermentation step, and afterripening fermentation step according to the miso producing apparatus shown in FIG. 1 will now be described.

(I) Lactic Fermentation Step

Raw solution (A) having a composition of 11% of glucose (=110 g/l), 10% of tamari-shoyu (=100 ml/l), and 8% of salt (=80 g/l) is stored in storage tank 11. Raw solution (A) is continuously supplied to fermentation tank 14 through pump 12.

Raw solution (A) supplied to tank 14 is circulated between tank 14 and condensed solution chamber 16a of ultrafiltration module 15 by pump 17, thereby undergoing lactic fermentation. In this case, a micro pore diameter of ultrafiltration film 15a of module 15 is preferably selected to be 1/10 an average size of lactic acid bacteria. Since the lactic acid bacteria cannot pass through film 15a, a lactic fermentation solution flowing into filtered solution chamber 16b can have no bacteria perfectly.

With the above arrangement, a lactic fermentation time can be caused to coincide with a residence time of raw solution (A) in tank 14. (The residence time is uniquely determined by the total volume of tank 14, module 15, and associated pipes, and a flow rate of the raw solution.) Therefore, when the operating speeds of pumps 12 and 17 are appropriately selected, excess fermentation of raw solution (A) can be prevented. Therefore, a lactic fermentation solution with uniform lactic concentration can be obtained from filtered solution chamber 16b of module 15.

The lactic fermentation solution with a constant lactic concentration (e.g., 3 to 4 mg/ml) is supplied to storage tank 18.

(II) Main Fermentation Step

Half the lactic fermentation solution stored in storage tank 18 is continuously supplied to fermentation tank 21 by pump 19, and main fermentation progresses in tank 21. In the main fermentation, glucose left in the lactic fermentation solution is converted to ethanol. The main fermentation solution overflows from the side portion of tank 21, and flows into precipitation tank 23. The main fermentation yeast cells are mixed in the overflow fermentation solution in precipitation tank 23. However, the main fermentation yeast cell has a size about 10 times a lactic acid bacteria cell, and has a good precipitation property. Therefore, the yeast cells can be easily separated by precipitation tank 23. The yeast precipitated in the bottom portion of tank 23 is returned to fermentation tank 21 through pump 24. The overflow solution (main fermentation solution) from the side portion of precipitation tank 23 is flowed into mixing tank 27.

By the above precipitation separation, the number of yeast cells in the main fermentation solution can be decreased to about 1/1000 of that in fermentation tank 21, thus preventing excess fermentation.

(III) Afterripening Fermentation Step

The remaining half lactic fermentation solution stored in storage tank 18 is continuously supplied to fermentation tank 22 through pump 20, and afterripening fermentation progresses in tank 22. In the afterripening fermentation, production of other flavorous components is performed. The afterripening fermentation solution prepared in fermentation tank 22 overflows from the side portion of tank 22, and is flowed into precipitation tank 25. The afterripening fermentation yeast cells are mixed in the overflow fermentation solution in precipitation tank 25, and are separated in tank 25. The yeast cells precipitated in the bottom portion of tank 25 are returned to fermentation tank 22 through pump 26. The overflow solution (afterripening fermentation solution) from the side portion of precipitation tank 25 is flowed into mixing tank 27.

Note that the afterripening fermentation solution can be prevented from being excessively fermented in the same manner as in main fermentation step (II).

The overflow solutions (main and afterripening fermentation solutions) from precipitation tanks 23 and 25 are supplied together to mixing tank 27 as flavor solution (B). Flavor solution (B) is mixed with digested material (C) in mixing tank 27 at a volume (or weight) ratio of 3:7 to 5:5, thus obtaining flavored, tasty miso (D).

In the above-mentioned three steps, organic acids, a taste component (amino acids produced by autolysis of yeast) as well as alcohols for flavor are produced at a predetermined concentration in main fermentation step (II). In afterripening fermentation step (III), organic acids, a taste component (amino acids) as well as phenols as another flavor component are produced at a predetermined concentration. Therefore, flavor solution (B) prepared by steps (II) and (III) has a stable quality.

Meanwhile, digested material (C) is prepared by a substantially stable enzyme reaction, and hence, its quality is also stable. Therefore, the quality (salt content, alcohol content, lactic acid content, sugar content, pH, flavor, and the like) of miso (D) prepared from flavor solution (B) and digested material (D) is also stable.

Note that digested material (C) is not limited to one prepared from soybeans, rice, salt, and the like as raw materials. If a material other than tamari-shoyu is used in raw solution (A), amazake (a sweet drink made from koji of rice), unrefined sake or soy, or dairy products such as yogurt with new flavor may be produced.

According to the apparatus shown in FIG. 1 using the miso producing method of the present invention, the following advantages can be expected.

(1) Since ultrafiltration module 15 is used in the lactic fermentation step (14 to 18), a change in quality of the fermentation solution upon removing lactic acid bacteria can be prevented. Since flow-out of lactic acid bacteria can be completely prevented, multiplication efficiency of lactic acid bacteria in fermentation tank 14 can be improved.

(2) Since separation by precipitation tanks 23 and 25 is performed in both main fermentation step (19, 21, 23, 24) and afterripening fermentation step (20, 22, 25, 26), the yeast cells are available to reuse so that the fermentation step can be simplified, and running cost upon production of miso can be reduced.

(3) A fermentation and ripening period requiring one to three months in the conventional method can be shortened to 3 to 12 days.

In the embodiment shown in FIG. 1, the main fermentation step (19, 21, 23, 24) is arranged parallel to the afterripening fermentation step (20, 22, 25, 26). However, the present invention is not limited to such parallel arrangement. For example, as shown in FIG. 4, the flow-out solution from precipitation tank 23 in the main fermentation step is supplied to fermentation tank 22 of the afterripening fermentation step through pump 20, and the flow-out solution from precipitation tank 25 of the afterripening fermentation step may be supplied to mixing tank 27 as flavor solution (B).

Alternatively, as shown in FIG. 5, the main fermentation step (19, 21, 23, 24) may be arranged parallel to the lactic fermentation step (14 to 18). In this case, pump 21 can supply raw solution (A) to tanks 14, 21, and 22. Therefore, pumps 19 and 20 are omitted from FIG. 5.

Furthermore, as shown in FIG. 6, a third fermentation step (61 to 64) may be arranged parallel to the main fermentation step (19, 21, 23, 24) or the afterripening fermentation step (20, 22, 25, 26). If useful strain (e.g., Saccharomyces cerevisiae), which is different from those for fermentation tanks 21 and 22, is added to fermentation tank 62 of the third fermentation step (61 to 64), a miso with a quality different from that of the apparatus shown in FIG. 1 may be obtained.

In the above embodiments, a heating sterilization step can be added between two adjacent steps. Reference numerals 71 to 75 in FIG. 7 denote heaters arranged midway along pipes. These heaters 71 to 75 need not always be employed, and any of heaters 71 to 75 may be used. (For example, only heaters 73 and 74 may be used.) If sterilization is performed using these heaters, re-fermentation can be prevented so that the salt concentration of digested material (C) supplied to mixing tank 27 can be reduced, thus allowing fast brewing of a low-salt miso.

Finally, the present invention is not limited to the embodiments disclosed in the present application. Various other changes and modifications may be made within the spirit and scope of the invention.

What is claimed is:

1. An apparatus for producing a lactic fermentation food, comprising:
   disgested-material supply means for supplying a digested-material as a major raw material of the lactic fermentation food;
   raw-solution supply means for supplying a raw solution as a sub-raw material of the lactic fermentation food;
   lactic fermentation means for performing a lactic fermentation treatment for the raw solution, to prepare a lactic fermentation solution;
   pH control means for maintaining the lactic fermentation solution at a predetermined pH;
   main fermentation means, for performing a first fermentation treatment for the lactic fermentation solution, to prepare a main fermentation solution;
   afterripening fermentation means, for performing a second fermentation treatment for the lactic fermentation solution, to prepare an afterripening fermentation solution, said lactic fermentation means, said main fermentation means and said afterripening fermentation means being coupled to said raw solution supply means for converting the raw solution into a flavor solution such that the fermentation solution and afterripening fermentation solution obtained are used as the flavor solution; and
   mixing means, coupled to said fermentation means and said digested-material supply means for mixing the flavor solution with the digested material to produce the lactic fermentation food.

2. The apparatus according to claim 1, wherein the lactic fermentation food is miso.

3. The apparatus according to claim 2, wherein the digested material contains a mixture of steamed-boiled soybeans, koji of rice, and salt.

4. The apparatus according to claim 2, wherein the raw solution contains glucose, tamari-shoyu, and salt.

5. The apparatus according to claim 1, wherein said lactic fermentation means includes:
   a lactic fermentation section for storing the raw solution and adding thereto lactic acid bacteria, to prepare a lactic fermentation solution;
   filter means for filtering, from the lactic fermentation solution, an aseptic lactic fermentation solution, from which the lactic acid bacteria are removed, as the lactic fermentation solution; and
   lactic fermentation solution-circulating means for circulating the lactic fermentation solution between said lactic fermentation section and said filter means.

6. The apparatus according to claim 5, wherein nitrogen gas is made to flow through the lactic fermentation solution in said lactic fermentation section.

7. The apparatus according to claim 1, wherein said main fermentation means includes:
   a main fermentation section for storing the lactic fermentation solution and adding thereto a predetermined yeast, to prepare a main fermentation solution;
   main fermentation solution-separation means for separating, form the main fermentation solution, an aseptic main fermentation solution form which the predetermined yeast is removed; and
   main fermentation solution circulating means for circulating the main fermentation solution between said main fermentation section and said main fermentation solution-separation means.

8. The apparatus according to claim 7, wherein said predetermined yeast is the genus Zygosaccharomyces rouxii 9. The apparatus according to claim 7, wherein aseptic air is made to flow through the main fermentation solution in said main fermentation section.

10. The apparatus according to claim 1, wherein said afterripening fermentation means includes:
    an afterripening fermentation section for storing the lactic fermentation solution and adding thereto a predetermined afterripening yeast, to prepare an afterripening fermentation solution;
    afterripening fermentation solution-separation means for separating, from the afterripening fermentation solution, an aseptic afterripening fermentation solution from which the predetermined afterripening yeast is removed; and
    afterripening fermentation solution-circulating means for circulating the afterripening fermentation solution between said afterripening fermentation section and said afterripening fermentation solution-separation means.

11. The apparatus according to claim 10, wherein the predetermined afterripening yeast is the genus Candida versatilis, 12. The apparatus according to claim 10, wherein the predetermined afterripening yeast is the genus Candida etchellsii.

13. The apparatus according to claim 10, wherein aseptic air is made to flow through the afterripening fermentation solution in said afterripening fermentation section.

14. The apparatus according to claim 1, further comprising:
    additional fermentation means, for performing a third fermentation treatment for the lactic fermentation solution, to prepare an additional fermentation solution, and
    wherein the main fermentation solution, the afterripening fermentation solution, and the additional fermentation solution are used as the flavor solution.

15. The apparatus according to claim 1, wherein said fermentation treatment means includes:
    lactic fermentation means, for performing a lactic fermentation treatment for the raw solution, to prepare a lactic fermentation solution;
    main fermentation means, for performing a first fermentation treatment for the lactic fermentation solution, to prepare a main fermentation solution; and
    afterripening fermentation means, for performing a second fermentation treatment for the main fermentation solution, to prepare an afterripening fermentation solution, and
    wherein the afterripening fermentation solution is used as the flavor solution.

16. The apparatus according to claim 15, wherein said lactic fermentation means includes:
    a lactic fermentation section for storing the raw solution and adding thereto lactic acid bacteria, to prepare a lactic fermentation solution;

filter means for filtering, from the lactic fermentation solution, an aseptic lactic fermentation solution, from which the lactic acid bacteria are removed, as the lactic fermentation solution; and lactic fermentation solution-circulating means for circulating the lactic fermentation solution between said lactic fermentation section and said filter means.

17. The apparatus according to claim 15, wherein said main fermentation means includes:

a main fermentation section for storing the lactic fermentation solution and adding thereto a predetermined yeast, to prepare a main fermentation solution;

main fermentation solution-separation means for separating, from the main fermentation solution, a sterilized main fermentation solution from which the predetermined yeast is removed; and main fermentation solution circulating means for circulating the main fermentation solution between said main fermentation section and said main fermentation solution-separation means.

18. The apparatus according to claim 17, wherein said afterripening fermentation means includes:

an afterripening fermentation section for storing the aseptic main fermentation solution and adding thereto a predetermined afterripening yeast, to prepare an afterripening fermentation solution;

afterripening fermentation solution-separation means for separating, from the afterripening fermentation solution, an aseptic afterripening fermentation solution from which the predetermined afterripening yeast is removed; and afterripening fermentation solution-circulating means for circulating the afterripening fermentation solution between said afterripening fermentation section and said afterripening fermentation solution-separation means.

19. The apparatus according to claim 1, wherein said fermentation treatment means includes:

lactic fermentation means for performing a lactic fermentation treatment for the raw solution, to prepare a lactic fermentation solution;

main fermentation means, for performing a first fermentation treatment for the raw solution, to prepare a main fermentation solution; and afterripening fermentation means, for performing a second fermentation treatment for the raw solution, to prepare an afterripening fermentation solution, and wherein the lactic fermentation solution, the main fermentation solution, and the afterripening fermentation solution are used as the flavor solution.

20. The apparatus according to claim 19, wherein said lactic fermentation means includes:

a lactic fermentation section for storing the raw solution and adding thereto lactic acid bacteria, to prepare a lactic fermentation solution;

filter means for filtering, from the lactic fermentation solution, an aseptic lactic fermentation solution, from which the lactic acid bacteria are removed, as the lactic fermentation solution; and lactic fermentation solution-circulating means for circulating the lactic fermentation solution between said lactic fermentation section and said filter means.

21. An apparatus according to claim 19, wherein said main fermentation means includes:

a main fermentation section for storing the raw solution and adding thereto a predetermined yeast, to prepare a main fermentation solution;

main fermentation separation means for extracting, from the main fermentation solution, a sterilized main fermentation solution from which the predetermined yeast is removed; and main fermentation solution-circulating means for circulating the main fermentation solution between said main fermentation section and said main fermentation solution-separation means.

22. The apparatus according to claim 19, wherein said afterripening fermentation means includes:

an afterripening fermentation section for storing the raw solution and adding thereto a predetermined afterripening yeast, to prepare an afterripening fermentation solution;

afterripening fermentation separation means for extracting, from the afterripening fermentation solution, an aseptic afterripening fermentation solution from which the predetermined afterripening yeast is removed; and afterripening fermentation solution-circulating means for circulating the afterripening fermentation solution between said afterripening fermentation section and said afterripening fermentation solution-separation means.

23. An apparatus according to claim 1 wherein said raw-solution supply means is provided with:

raw-solution sterilization means for sterilizing the raw solution by heating, and supplying the sterilized raw solution to said fermentation treatment means.

24. The apparatus according to claim 1, wherein said mixing means is provided with:

sterilization means for sterilizing the lactic fermentation food by heating.

25. The apparatus according to claim 1, wherein said lactic fermentation means is provided with:

lactic acid bacteria solution sterilization means for sterilizing the lactic fermentation solution by heating.

26. The apparatus according to claim 5, wherein said main fermentation means is provided with:

main fermentation solution sterilization means for sterilizing the main fermentation solution by heating.

27. The apparatus according to claim 1, wherein said afterripening fermentation means is provided with:

afterripening fermentation solution sterilization means for sterilizing the afterripening fermentation solution by heating.

* * * * *